United States Patent [19]

Cancio et al.

[11] Patent Number: 4,465,729

[45] **Date of Patent: * Aug. 14, 1984**

[54] CROSS-TEARABLE PLASTIC FILMS

[75] Inventors: Leopoldo V. Cancio; Pai-Chuan Wu, both of Cincinnati, Ohio

[73] Assignee: Clopay Corporation, Cincinnati, Ohio

[ * ] Notice: The portion of the term of this patent subsequent to Nov. 3, 1989 has been disclaimed.

[21] Appl. No.: 482,182

[22] Filed: Apr. 5, 1983

Related U.S. Application Data

[63] Continuation-in-part of Ser. No. 290,354, Aug. 5, 1981, Pat. No. 4,380,564, which is a continuation-in-part of Ser. No. 57,792, Jul. 16, 1979, Pat. No. 4,298,647.

[51] Int. Cl.[3] .......................... B32B 3/30; B32B 27/20

[52] U.S. Cl. .................................... 428/167; 156/209; 156/244.11; 264/293; 427/207.1; 428/172; 428/323; 428/332; 428/343; 428/500; 428/511

[58] Field of Search ................. 428/43, 167, 172, 323, 428/332, 343, 500, 511, 137, 213, 215, 220; 427/207 R, 207.1; 264/284, 293; 156/244.11, 209, 249.15

[56] References Cited

U.S. PATENT DOCUMENTS

| | | | |
|---|---|---|---|
| 2,166,352 | 7/1939 | Hamilton | 41/10 |
| 2,371,318 | 3/1945 | Rosenfeld | 41/34 |
| 3,143,208 | 8/1964 | Sizemore, Jr. | 206/56 |
| 3,379,814 | 4/1968 | Bracey, Jr. | 264/322 |
| 3,484,835 | 12/1969 | Trounstine et al. | 161/130 |
| 3,511,335 | 5/1970 | Uddenborg | 181/33 |
| 3,527,859 | 9/1970 | Fairbanks | 264/177 |
| 3,563,839 | 2/1971 | Divis | 161/57 |
| 3,723,169 | 3/1973 | Guastella et al. | 427/179 |
| 3,783,088 | 1/1974 | Yoshiyasu et al. | 161/160 |
| 3,794,554 | 2/1974 | Caring | 428/43 |
| 4,135,023 | 1/1979 | Lloyd et al. | 428/167 |
| 4,139,669 | 2/1979 | Chang | 428/167 |
| 4,173,676 | 11/1979 | Asakura et al. | 428/332 |
| 4,186,781 | 2/1980 | Kim | 139/240 |
| 4,298,647 | 11/1981 | Cancio et al. | 428/167 |

FOREIGN PATENT DOCUMENTS

| | | |
|---|---|---|
| 7109120 | 12/1971 | France . |
| 1088564 | 10/1967 | United Kingdom . |
| 1206974 | 9/1970 | United Kingdom . |
| 1301198 | 12/1972 | United Kingdom . |
| 1331354 | 9/1973 | United Kingdom . |
| 1420329 | 1/1976 | United Kingdom . |

*Primary Examiner*—Paul J. Thibodeau
*Attorney, Agent, or Firm*—Wood, Herron & Evans

[57] ABSTRACT

A plastic film is disclosed having a fine grid of embossed intersecting hand-tear lines formed in the surface of the film whereby the film may be torn by hand in more than one direction. The film is composed of a polymeric material incorporating a dispersed phase. The film is particularly suited for the manufacture of articles requiring sizing of the material in both lengthwise and widthwise direction to conform the film to a desired size.

20 Claims, 2 Drawing Figures

CROSS-TEARABLE PLASTIC FILMS

CROSS-REFERENCE TO RELATED APPLICATIONS

This application is a continuation-in-part of U.S. Ser. No. 290,354 filed Aug. 5, 1981 now U.S. Pat. No. 4,380,564 which in turn is a continuation-in-part of U.S. Ser. No. 57,792 filed July 16, 1979, now U.S. Pat. No. 4,298,647.

BACKGROUND OF THE INVENTION

This invention relates to polymer films having a fine grid of hand tear lines permitting sizing of the film by hand in more than one direction without the use of cutting tools.

Our U.S. Pat. No. 4,298,647 and the related application U.S. Ser. No. 290,354 now U.S. Pat. No. 4,380,569, resulted from an investigation under-taken to develop a plastic film or sheet material which could be sized by hand without the use of cutting tools in both a lengthwise and widthwise direction to quickly and easily conform it to the surface which it is to cover. That investigation was directed particularly to developing a decorative plastic covering material which could be used, for example, as a shelf liner. In the course of that investigation, a sheet material which tore easily and cleanly in both directions with generally the same degree of tearing force but which also had good tensile strength in both its lengthwise and widthwise direction to be able to withstand normal handling during both fabrication and use without unintentional tearing of the material was developed. This material has been in the marketplace and has been commercially successful. During the course of further development work, it was recognized that there existed a further need for plastic films having the same desirable properties but for uses other than the decorative covering of a surface. Examples of such applications are in the medical field wherein there is a need for hand-sizable plastic tape with adhesive on one side thereof whereby medical personnel simply can tear off a piece of adhesive tape of exactly the desired length and width to suit the particular need. Another application would be in the formation of hand-tearable films such as may be useful for providing the film for a hand-sizable window shade. Surprisingly, we have discovered that the present invention is handtearable through a heat seal further adding to its usefulness as a window shade film.

In the development of the decorative shelf liner, the size of the grid of hand tear lines was on the order of a ¼ inch with it being thought that 1/16 inch was the lower desired limit. We have now determined that in the other applications referred to above it is desirable to have a fine grid size of hand-tear lines on the order of less than a 1/16 inch and particularly 1/32 inch or less.

SUMMARY OF THE INVENTION

To this end, this invention provides polymer films which are tearable by hand in more than one direction, for example, in both a lengthwise and widthwise direction. The films are provided with a fine grid of intersecting tear lines whereby the material may be torn by hand along chosen lines in both directions to conform the material to a desired lengthwise and widthwise size. The separation between hand tear lines in both the widthwise and lengthwise directions is on the order of less than 1/16 inch and preferably on the order of 1/32 inch to provide a fine grid size permitting the plastic films to be sized to substantially any desired size within the confines of the overall size of the material. Moreover, the films are handsizable with generally the same degree of force in either of two directions but without significant loss of tensile strength of the film as a whole in any direction.

The films disclosed in the aforementioned patent and patent application comprised a major portion of polymeric material with a minor portion of a dispersed phase. It has been found, however, that with the fine grid patterns of the present invention it is desirable to increase the content of the dispersed phase, for example, to about equal portions of polymeric material and dispersed phase, to enhance tearability. Further, the film of the present invention is embossed to form a series of more closely spaced intersecting tear lines in the surface of the film the film nevertheless being relatively strong but easily and cleanly tearable by hand along the tear lines to provide a smooth, straight edge after tearing. The invention of this application is particularly directed to uses other than a decorative surface covering material and can include an adhesive applied to one side to permit securing of the film to a surface, e.g., as an adhesive or medical tape.

In accordance with this invention, a plastic film composed of about equal percentages of polymeric material and a dispersed phase is formed and embossed with a first set of parallel tear lines spaced one from another and a second set of parallel tear lines spaced one from another such that two sets of tear lines intersect each other permitting sizing of the material in two directions with substantially the same degree of tearing force. In a preferred form of the invention, the film has an extended lengthwise direction, and one set of tear lines runs parallel to the long free edges of the film and the other set runs parallel to the short or widthwise free edges of the sheet, the two sets of lines intersecting perpendicularly.

One side of the film may be provided with an adhesive such as a water-based adhesive or a pressure-sensitive adhesive covered by a suitable protective material which may be removed prior to sizing of the film to expose the adhesive. The plastic film is thus securable to a surface. The lengthwise and widthwise tear lines permit the film to be sized in two directions such that the film may be conformed to both a desired length and width prior to being applied to the surface. The tearing along these lines results in sizing of the material to conform to a desired size and leaves smooth, straight edges after sizing.

The films of this invention are made from suitable polymers, preferably of the thermoplastic polyolefin type and particularly polyethylene, polypropylene, and copolymers and blends thereof. The polymeric material contains a dispersed phase which has been found to be very beneficial in providing good tearability characteristics along the tear lines, including the characteristic that the material may be torn in either direction with substantially the same tearing force. In a particularly preferred form of the invention, the polymeric component consists of about 50% low density polyethylene while the dispersed phase consists of about 50% calcium carbonate. This composition has been found to be particularly advantageous for a fine grid pattern film in that it provides good tear characteristics in both directions while maintaining good tensile strength in all directions without substantial loss of strength over time. The thickness of the sheet material can vary over a wide range, for example, from about 1 mil to about 10 mils. The advantages of this invention have been achieved by forming a polymer film having embossed tear lines in the range of 2 to 10 mils in width with a 50% to 60% reduction in sheet thickness in the embossed portion of the sheet, the lines being less than about 1/16" apart in both the widthwise and lengthwise directions to form a fine grid pattern of hand-tear lines.

The advantages and objects of this invention will be further appreciated by the following detailed description of the invention with reference to the accompanying drawings.

BRIEF DESCRIPTION OF THE INVENTION

FIG. 1 is a pictorial view illustrating a roll of plastic film according to this invention (the separation between tear lines being greatly exaggerated for purposes of description) and illustrating the tearing of the film of a desired size in both the lengthwise and widthwise direction; and FIG. 2 is a greatly enlarged view of one side of a portion of the film for purposes of illustrating the form and dimensions of the tear lines.

DETAILED DESCRIPTION OF THE INVENTION

Figure 1:
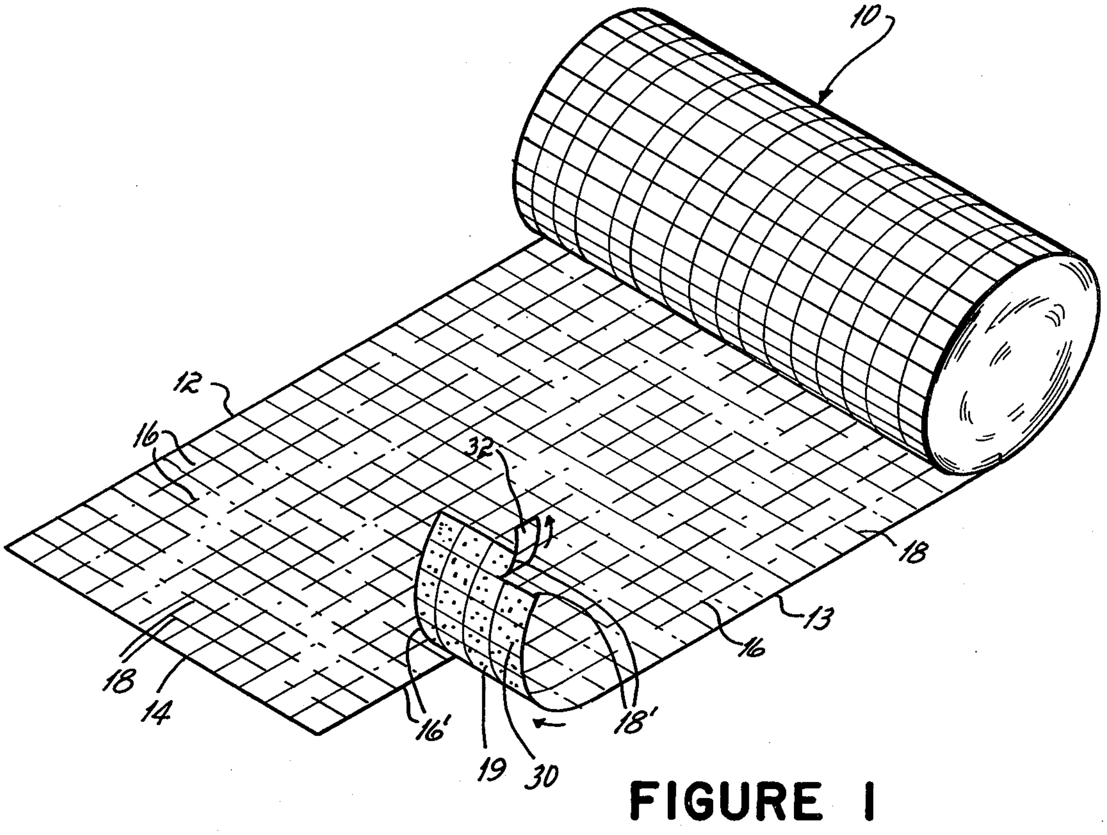

With reference to the drawings, the roll 10 of FIG. 1 depicts a suitable plastic film such as thermoplastic polyolefin material of the polyethylene or polypropylene type. This film can have a thickness in the range of about 1 mil to about 10 mils, as desired, with about 5 to 6 mils being preferred. As shown, the film has a pair of free lengthwise edges 12 and 13 and a widthwise edge or dimension 14. The lengthwise edges 12 and 13 are substantially parallel to one another. A series of lengthwise hand tear lines 16 in the film 10 extend substantially parallel to the free edges 12, 13 of the film. A series of substantially perpendicularly intersecting hand tear lines 18 in the film 10 extend substantially parallel to the free edge 14 of the film.

The intersecting tear lines 16, 18 are respectively spaced at regular intervals across the surface of the film. The lines may be spaced at any desired distance to give a desired degree of sizing but preferably are formed at less than about 1/16" spacing, such as 1/32" intervals. Of course, the closer the lines are together the closer the film can be sized to the desired size. One side of the film 10, i.e., the underside 19, can have an adhesive on the surface thereof, e.g., a pressure-sensitive adhesive or a water-based adhesive, permitting the material 10 to be secured, e.g., by contact, to a surface. Such adhesives are known to the art. An example of a suitable adhesive is Resyn Seal 33-2066 sold by the National Adhesive Company. It may be diluted with water to apply at a rate of 3.5 to 4.0 pounds per ream.

In the commercial practice of the invention, a particularly preferred composition would consist of about 50–60% by weight, low density polyethylene and about 40–50%, by weight, $CaCO_3$. One composition actually made which exhibited excellent tear characteristics in both directions, good tensile strength, and resistance to aging consisted of a mixture of 50%, by weight, low density polyethylene, with 50%, by weight, $CaCO_3$. The average particle size of the $CaCO_3$ was 12 microns. Other materials such as pigments may be added to the composition.

The pattern of cross tear lines in the sheet material 10 is formed by embossing a plastic film with embossing rolls. A preferred technique for producing the embossed cross tear lines according to this invention employs a slot die extrusion method wherein the plastic material with its second phase constituent is heated to a temperature of about 400° F. and then introduced into the nip formed by the contact between a metal embossing roll engraved with a raised regular pattern of perpendicularly intersecting lines and a hard rubber roll. The metal roll under suitable pressure presses into the rubber roll to produce a thin film having the embossed design. The speed of the rolls is maintained to permit continuous embossing of the plastic film with the design according to this invention. The embossing process, known as the slot cast process, is known to the art and the parameters thereof may be varied depending upon the plastic material used, the thickness of the sheet material, and the width and depth of the tear lines desired.

Figure 2:
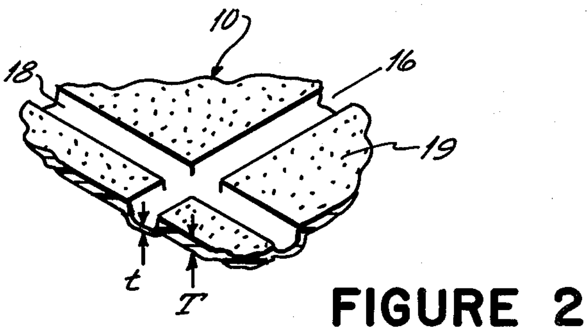

Referring in addition to FIG. 2, the embossed sheet material produced according to the method just described includes a series of regular, spaced tear lines which protrude slightly above the underside surface 19 of the sheet material 10. For purposes of example only, in a sheet of plastic material having a thickness, T, of about 5 to 6 mils, tear lines 16 and 18 of about 2 to 10 mils in width are produced with the thickness, t, of material in the tear line being about 2 ½ to 3 mils. Thus, the reduction in sheet thickness produced by the embossing process is on the order of 50 to 60%. This reduction in thickness provides lines of weakness in the material along which the material may be torn by hand. As stated above, the embossed cross-tear pattern in combination with the composition of the film provides the film with the desirable properties of this invention.

The cross-tearable film of this invention may be formed of a polymeric material, as described above, wherein the dispersed phase is another polymeric material which by virtue of its viscoelastic behavior or thermal behavior forms a second phase when dispersed in the matrix. An example of such a composition is the following formulation: 50–70 parts by weight low density polyethylene, 40–20 parts by weight polypropylene, and 10 parts by weight PETG. The PETG is a high melting point, high viscosity polymer. It is a polyester copolymer of terephthalic acid, ethylene glycol and cyclohexane dimethanol and is available commercially from the Eastman Chemical Company.

The present invention also admits of a number of variations all within the scope thereof. For example it is possible to co-extrude the preferred polymer material with a sheet of other material. One possibility is to form a film of cross-tearable material 6 mils in thickness by co-extrusion of 4 mils of the preferred composition set forth above and 2 mils of high density polyethylene. The co-extruded film is embossed to form the desired tear lines. Another possibility is to extrusion coat the preferred polymeric film material on paper, scrim or other substrate. A suitable combination is the Dow 550-calcium carbonate composition described above which is extrusion coated on a paper substrate which has been bleached and left 3 mils in thickness. The two-layer laminate is then embossed with the cross-tear lines.

The co-extrusion techniques just described may be employed to lower the cost of the film where the second phase is less expensive then the preferred composition or to provide a surface that may print better for receiving a surface design or which may receive an adhesive better. For example, foamed polyethylene prints better than the low density polyethylenecalcium carbonate composition. Thus, by co-extruding the two, a better printing surface is provided without detracting from the other highly desirable properties of the film.

The tear lines 16 and 18 also can be formed by other methods such as compression molding. The tear lines also can be formed in the nip created by a metal embossing roll and a metal, instead or rubber, roll. This method is desirable where the upperside 26 is to be printed upon since a raised surface might interfere with some printing operations.

In addition, it has been found that film made by the slot cast process is often somewhat easier to tear in its machine direction, i.e., the direction along which the material is made than in a direction transverse thereto. Thus, an embossing roll can be designed to compensate for this effect by having a more pronounced embossing depth in the transverse direction than in the machine direction to compensate for this difference.

The advantages of this invention may be readily appreciated by observing the ease with which the plastic film made according to this invention may be sized. To size the film in the lengthwise direction, the user simply grasps the desired width of material 30 at a desired hand tear line 16′ and pulls to separate it from the remainder of the roll 10. The plastic sheet material tears easily and cleanly along the line 16′. This operation is repeated in the widthwise direction, the user again grasping the desired length of material 32 and tearing along the desired line 18′ to separate it from the remainder of the roll 10.

When a pressure-sensitive adhesive is used with a protective covering, the protecting covering may be removed to expose the adhesive after which the torn film is secured to a surface. Although this invention has been described in terms of certain preferred embodiments, it will be appreciated by those skilled in the art that other forms may be adopted within the scope of the invention.

We claim:

1. A method of producing a plastic film which may be torn by hand along one or more hand-tear lines without the use of cutting tools comprising the steps of:

providing a polymeric material, introducing into said polymeric material a material forming a dispersed second phase in a matrix of said polymeric material, forming said polymeric material containing said dispersed second phase into a film, and embossing said film to form a series of substantially parallel continuous, imperforate hand-tear lines of reduced film thickness therein, said lines being spaced less than about 1/16″ apart, said material forming said dispersed second phase being present in said film in an amount effective to initiate and propagate tear along said hand-tear lines by hand-tearing without the use of cutting tools.

2. The method of claim 1 wherein said film is formed of a polymeric material chosen from the group consisting of polyolefins, copolymers of polyolefins and blends thereof.

3. The method of claim 1 wherein said material forming said dispersed phase is calcium carbonate.

4. The method of claim 1 wherein said polymeric material is low density polyethylene and said material forming said dispersed phase is calcium carbonate.

5. The method of claim 1 wherein said film is composed of about 50–60% by weight low density polyethylene and about 40–50% by weight calcium carbonate.

6. The method of claim 1 wherein said material forming said dispersed phase is a polyester copolymer of terephthalic acid, ethylene glycol and cyclohexane dimethanol.

7. The method of claim 1 further comprising applying an adhesive to one side of said film.

8. The method of claim 1 wherein said film is co-extruded with another polymer.

9. The method of claim 1 wherein said film is laminated to another sheet material.

10. The method of claim 9 wherein said lamination is achieved by extrusion coating.

11. The method of claim 9 wherein said another sheet material is paper.

12. The method of claim 1 wherein said film is formed and embossed by a melt-embossing process.

13. The method of claim 1 wherein said film is embossed with a pattern of intersecting hand-tear lines and wherein said film may be torn in at least two directions by hand with generally the same degree of tearing force.

14. A hand-tearable plastic film which may be torn by hand along one or more hand-tear lines without the use of cutting tools comprising an embossed polymeric film having a series of substantially parallel continuous imperforate hand-tear lines of reduced film thickness spaced less than about 1/16 inch apart, said film being formed of a polymeric matrix containing a dispersed second phase in an amount effective to initiate and propagate tear along said hand-tear lines such that said film may be torn by hand without the use of cutting tools.

15. The hand-tearable plastic film of claim 14 wherein said film is a melt-embossed film of from about 1 to 10 mils in thickness.

16. The hand-tearable plastic film of claim 14 wherein said dispersed second phase is calcium carbonate in an amount of at least about 40% by weight.

17. The hand-tearable plastic film of claim 16 wherein the calcium carbonate has an average particle size of about 12 microns.

18. The hand-tearable plastic film of claim 14 wherein said polymeric matrix chosen from the group consisting of polyolefins, copolymers of polyolefins and blends thereof.

19. The hand-tearable plastic film of claim 14 wherein said polymeric matrix is formed of low density polyethylene with calcium carbonate dispersed therein as said second phase.

20. The hand-tearable plastic film of claim 14 wherein said film has substantially parallel free lengthwise edges extending in the machine direction of said film and a widthwise direction perpendicular thereto and including a first set of hand-tear lines extending in said widthwise direction from lengthwise edge to lengthwise edge, and a second set of hand-tear lines intersecting said first set of hand-tear lines perpendicularly, said film being sizable by hand in two directions with generally the same degree of tearing force.

* * * * *

UNITED STATES PATENT AND TRADEMARK OFFICE

CERTIFICATE OF CORRECTION

PATENT NO. : 4,465,729

DATED : August 14, 1984

INVENTOR(S) : Leopoldo V. Cancio et al

It is certified that error appears in the above-identified patent and that said Letters Patent is hereby corrected as shown below:

On the title page. [*] Notice:, "Nov. 3, 1989" should read --Nov. 3, 1998--.

Signed and Sealed this

*Fifth* Day of *March 1985*

[SEAL]

*Attest:*

DONALD J. QUIGG

*Attesting Officer* *Acting Commissioner of Patents and Trademarks*